Oct. 15, 1935.　　　　J. W. LEIGHTON　　　　2,017,316
INDIVIDUAL FRONT WHEEL SUSPENSION FOR MOTOR VEHICLES
Filed Nov. 8, 1934
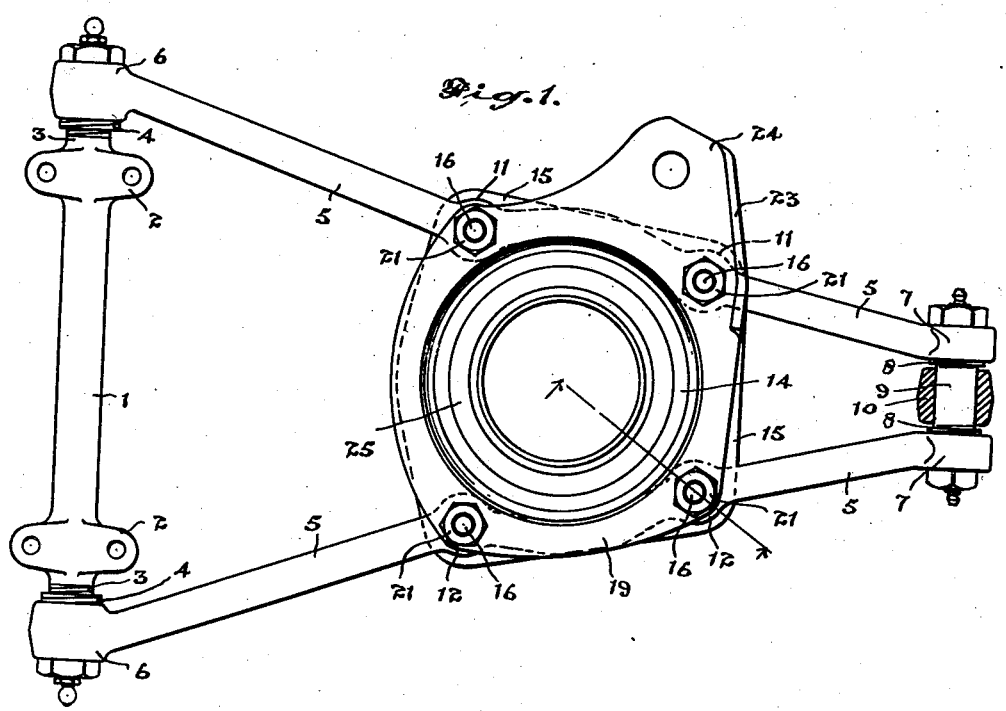
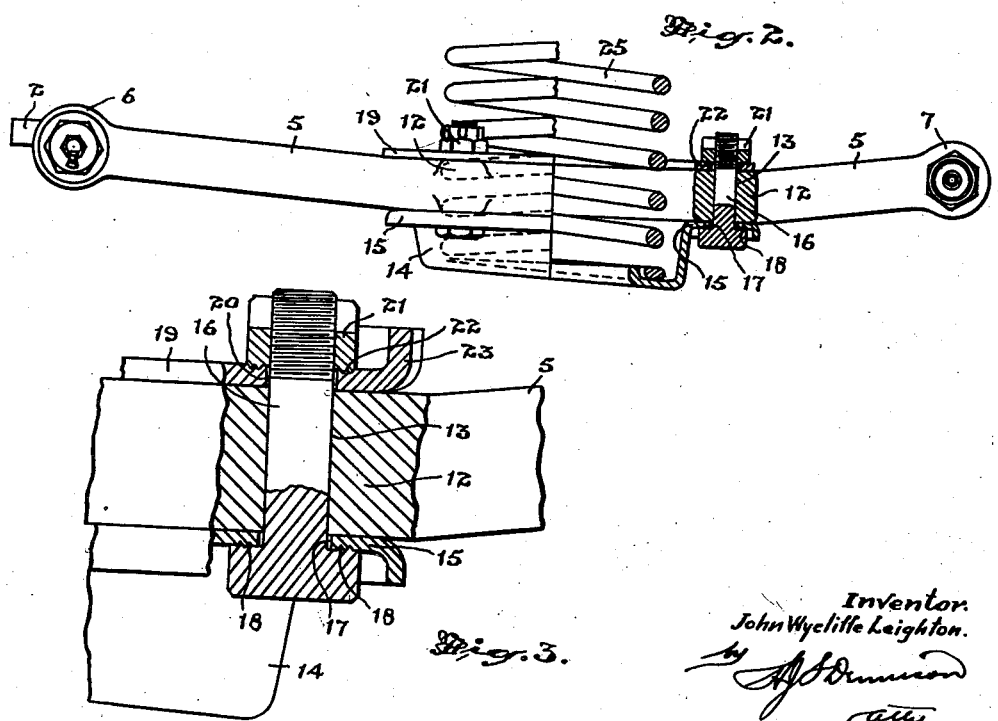
Inventor.
John Wycliffe Leighton.

Patented Oct. 15, 1935

2,017,316

UNITED STATES PATENT OFFICE 2,017,316

INDIVIDUAL FRONT WHEEL SUSPENSION FOR MOTOR VEHICLES

John Wycliffe Leighton, Port Huron, Mich.

Application November 8, 1934, Serial No. 752,053

10 Claims. (Cl. 267—20)

The principal objects of this invention are to greatly simplify the construction of the lower pivotal arm and its intimately associated parts used in the "wishbone" type of independent front wheel suspensions, thereby effecting material reduction in cost in both the manufacture of the parts and their assembly.

Numerous forms of structures for the front wheel suspensions of motor vehicles have been devised, and a well known type is extensively used in which the lower pivotal arm connection between the king pin bracket and the vehicle frame is of a V or "wishbone" shape. A great many forms of pivot joints have been associated with this type of pivotal arm, and much accurate and expensive structural and machine work is required in producing such structures so that they may be assembled and adjusted with accuracy.

The principal features of the invention consist in the novel construction of the lower "wishbone" pivot arm support whereby a pair of bars are rigidly connected intermediate of their length by plate members extending therebetween and which are rigidly clamped thereto, while the bearing ends of the bars are held in their relatively assembled position, said plate members forming the supports for the spring support of the vehicle frame.

In the accompanying drawing, Figure 1 is a plan view of my improved structure.

Figure 2 is an elevational part sectional view of the structure illustrated in Figure 1.

Figure 3 is an enlarged longitudinal sectional view of one of the bolts for securing the arms and fastening plates together.

In the structure illustrated in the accompanying drawing, the pivot bar 1 upon which the "wishbone" arm structure is mounted, is rigidly secured to the vehicle frame in acute angular relation to the centre line of the vehicle. This bar is preferably formed of a length of steel rod upset or deformed adjacent to its ends to form the brackets 2 by means of which it is bolted to the frame.

The ends 3 of the bar are threaded preferably with a rolled thread, and upon these threaded ends are mounted the correspondingly threaded bushings 4. The bushings are preferably externally threaded with a locking thread of the same pitch as the bearing thread.

A pair of arms 5, which are preferably mainly of elliptical cross section, are forged with eye ends 6 threaded to receive the external threads of the bushings 4. The opposite ends of these arms 5 are formed with eye ends 7 threaded to receive the external locking threads of bushings 8, which bushings are internally threaded with bearing threads of the same pitch as the external threads to engage the correspondingly threaded ends of a pin 9.

The central portion of the pin 9 is mounted in a member 10 which forms the steering knuckle support. The particular construction of this steering knuckle support is not herein shown as it forms no definite part of the present invention and its design may be varied considerably without affecting the present invention.

Each of the arms 5 is upset or deformed at points intermediate of its length to form the spaced-apart bosses 11 and 12, which bosses are provided with cylindrical bolt holes 13 extending vertically therethrough.

The section of the arms 5 between the paired bosses 11 and 12 is bent into an arc shape to conform to the circle of the dished centre 14 of a plate 15, the rim of which is flanged outwardly and downwardly and the flat top surface of the rim engages the underside of each of the arms 5 in their spaced positions.

Bolts 16 fitting snugly in the bolt holes 13 of the arms 5 extend through slots 17 in the rim of the plate 15, the slots permitting the plates to be adjusted in relation to the arms. The inner face of the heads of the bolts 16 is provided with one or more circular knife-edge projections 18 which bite into the plate when it has been moved to its desired position to lock and hold the plate firmly in position when the bolt is ultimately tightened.

A ring plate 19 is placed upon the top side of the arm 5 and this plate is also provided with slots 20 to permit its adjustment after it is assembled. Lock nuts 21 are threaded on the bolts 16 and are provided with one or more circular knife-edge projections 22 which bite into the upper plate to hold it securely when the nuts are tightened.

The ring plate 19 is formed with a flanged edge 23 and a laterally extending lug 24 to provide a convenient bracket or step to engage a jack when it becomes necessary to jack up the car.

The dished centre 14 of the plate 15 supports the spiral compression spring 25 for supporting the vehicle frame and the spring extends upwardly through the ring plate 19.

The lower and upper plates 15 and 19 are clamped securely by the bolts 16, and when so clamped they hold the arms 5 in a rigid permanent position in relation to each other and to their respective bearing ends.

The provision of slots in these plates permits of easy assembly so that variation in the threading of the eye ends of the arms will be permitted to adjust themselves to proper alignment without causing detrimental binding in the threaded bearing surfaces, and when the nuts of the bolts are tightened so as to cause the circular knife edge projection to bite into the steel, there will be no possibility of the plates or arms shifting from their relative positions.

It will be readily appreciated by those skilled in the art that a structure such as described will be more desirable than the cumbersome and expensive "wishbone" forgings, and the arrangement of the bushed bearing ends will dispense with the expensive "yolk" forgings which are now commonly used.

In addition to simplifying and rendering the "wishbone" arms less expensive in construction, the construction herein described will be much easier to assemble and will dispense with many gauges and tools otherwise required for accuracy.

This device is herein shown and described in the simplest form, but it will be readily understood that adaptations which are known in other forms of devices may be applied hereto for the purpose of caster adjustment without affecting the principal feature of this invention.

What I claim as my invention is:—

1. In an individual front wheel suspension for motor vehicles, the combination with a pivot member mounted on the frame of the vehicle, of a pair of separate arms adapted for individual assembly at one end on a respective end of said pivot member, said arms converging toward their outer ends, bridge means formed separate from said individual arms and extending transversely therebetween and adapted to rigidly connect said respective arms intermediate of their length, and a wheel support member journalled in the outer ends of said arms, the connection between said arms and bridge means being of an adjustable character to facilitate accurate assembly of said elements.

2. The combination with a vehicle frame and horizontally aligned pivots mounted thereon, of a pair of individual arms adapted for individual journalled assembly on said pivots and to extend outwardly therefrom, a wheel support member journalled at the outer ends of said arms, said arms presenting substantially flat surfaces intermediate of their length adapted to be disposed in a common plane, a plate extending horizontally between said arms and overlapping the respective flat surfaces thereof and means extending through said plate and through said respective arms rigidly securing same in an assembled position, said individual arms being each adjustable relative to said connecting plate to facilitate accurate assembly of said elements and minimize binding at the journals.

3. The combination with a vehicle frame and horizontally aligned pivots on said frame, of a pair of individual bars capable of individual journalled assembly at their inner ends on said pivot and extending outwardly therefrom, said bars each having paired bolt holes therethrough intermediate of their length, a plate extending between said arms having slots to register with said bolt holes, bolts extending through the slots in said plate and the holes in said arms and adapted to bind said arms and plates rigidly after assembling, said slots permitting adjustment of each of said arms relative to said plate, and a wheel support member journalled in the outer ends of said arms.

4. The combination with a vehicle frame and horizontally aligned pivots, of a pair of arms having journal ends mounted on said pivots and extending outwardly, each of said arms having enlarged intermediate portions and bolt holes therethrough, a plate extending beneath said arms having slots registering with said bolt holes, bolts fitted in said bolt holes and extending through the slots in said plate and having concentric ridges to engage and lock said plate in an assembled position, and a wheel support member journalled in the outer ends of said arms.

5. The combination with a vehicle frame and a pair of aligned pivots thereon, of a pair of arms journalled on said pivots and extending outwardly, a wheel support member journalled in the outer ends of said arms, a plate extending between said arms having slots therein, bolts mounted in said arms extending through said slots and adapted to grip and hold said plate in an assembled position, a plate assembled on said bolts above said arms having slots therein, and nuts threaded on said bolts adapted to grip said upper plate and to bind the upper and lower plates and said arms in fixed assembled relation.

6. The combination with a vehicle frame and aligned horizontal pivot bearings thereon, of a pair of arms pivotally mounted on said bearing pivots and extending outwardly, a wheel support member journalled in the outer ends of said arms, a dished plate having a flange engaging the under side of said arms, bolts extending through said plate and said arms, a plate ring engaging the upper side of said arms and slotted to receive said bolts, said ring having a lateral extension forming a jack bracket, and nuts threaded on said bolts and binding said arms and plates rigidly together.

7. An arm for independent wheel suspension for motor vehicles comprising a pair of arms extending between the vehicle frame and a wheel support member having oscillatory connections at the ends of each arm, and a member connecting said arms intermediate of their length, and adjustable relative to each of said arms to effect a free movement in said oscillatory connections.

8. In an independent vehicle wheel suspension, in combination, a forked or "wishbone" member for threaded oscillative mounting on the vehicle frame and formed of two separate and independent arms, a bar member common to both of said arms for mounting on the frame and having its opposite ends provided with threaded bearing surfaces, said separate arms having threaded bearing surfaces capable of individual threaded assembly on the respective threaded ends of said bar member whereby free individual axial positioning of the said arms is permitted on the threaded bearing ends, wheel support means oscillatably connected with the outer ends of said arms and means for finally connecting said separately positioned arms intermediate of their length to form therewith a single free-swinging unit and being adapted to be applied to said arms after the individual assembly thereof on the threaded ends of said bar to secure said arms in their axially adjusted assembled relation to thereby avoid objectionable binding of the threaded bearings.

9. In an individual wheel suspension, a lower hinge suspension arm formed of two separate sections adapted for individual assembly and adjustment on axially spaced and aligned frame bearings and having spaced openings arranged intermediate of their length, a spring support member formed separate from said arm sections and adapted to be arranged in bridging relation to the spaced arms, said bridging plate being perforated in registering alignment with the spaced openings of the respective arms, and fastening members extending through the aligned openings of the arms and bridging member and securing said members in a rigid unit whereby the axially spaced relation and adjustment of said individually assembled arms is definitely preserved.

10. Means as claimed in claim 9 in which said bridging plate comprises a suspension spring seat and means provided for relative lateral adjustment of the arms and spring seat at the points of attachment of the spring seat to said arms to obviate the objectionable crowding of the interengaging thread surfaces in an axial direction so that the threads in the oscillative joints will nest properly.

JOHN WYCLIFFE LEIGHTON.